US 6,707,914 B1

(12) United States Patent
Bell (10) Patent No.: US 6,707,914 B1
(45) Date of Patent: Mar. 16, 2004

(54) SYSTEM AND METHOD FOR ENCRYPTING INFORMATION WITHIN A COMMUNICATIONS NETWORK

(75) Inventor: Robert T. Bell, Bountiful, UT (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/450,861

(22) Filed: Nov. 29, 1999

(51) Int. Cl.[7] .............................................. G06F 01/24
(52) U.S. Cl. ............................ 380/46; 380/23; 380/43; 380/50
(58) Field of Search ........................... 380/46, 43, 50, 380/23

(56) References Cited

U.S. PATENT DOCUMENTS 5,008,938 A * 4/1991 Freeburg et al. ............ 380/265
6,560,727 B1 * 5/2003 Pierson et al. .............. 714/704

* cited by examiner

Primary Examiner—Thomas R. Peeso
(74) Attorney, Agent, or Firm—Baker Botts L.L.P.

(57) ABSTRACT

Within a communications system, first and second end stations coupled to a network participate in a communications session with one another using the network. Each end station includes an encryptor having at least a first linear feedback shift register (LFSR) and at least an associated first interconnect mask of a length not longer than the length of the first LFSR. At a particular one of the end stations, the encryptor generates an output sequence using the first LFSR and the first interconnect mask. An interconnect mask table contains polynomials that each correspond to an available interconnect mask. The end station receives a session key specifying the first interconnect mask. The end station uses the output sequence of the encryptor to encrypt an information stream during the session. In one particular embodiment, the network includes a local area network (LAN) that supports Internet Protocol (IP) and the end stations use real time protocol (RTP) to communicate audio information streams.

41 Claims, 4 Drawing Sheets

SYSTEM AND METHOD FOR ENCRYPTING INFORMATION WITHIN A COMMUNICATIONS NETWORK

TECHNICAL FIELD OF THE INVENTION

This invention relates in general to the field of communications and in particular to encrypting information within a communications network.

BACKGROUND OF THE INVENTION

Many communications networks incorporate techniques for encryption of the information transmitted between components in the network. For example, a local area network (LAN) connecting multiple end stations and supporting Internet Protocol (IP) might incorporate a technique for encrypting voice, data, video, or other information streams transmitted between end stations during a communications session. Successful operation of the network will in many instances depend on the ability of this encryption technique to satisfy performance, flexibility, regulatory, and other requirements while providing a desired level of privacy for communications over the network.

As the communications industry continues to dominate the growth of the global economy, providing a desired level of privacy for network users while also satisfying performance, flexibility, regulatory, and other requirements has become increasingly important. In particular, the advent of IP telephony has increased the requirements for information privacy to a marked degree. However, prior encryption techniques used for transferring information streams between computers typically involve computationally intensive encipherment techniques that provide a much higher level of security than is typically needed for IP telephony. As such, use of these techniques in an IP telephony environment may contravene the cryptography axiom that the encryptor should ideally be tailored to particular security needs rather than providing, in all situations and without regard to the data being transmitted, the most powerful encryption possible. Other prior encryption techniques, although generally better adapted to the information and other requirements associated with IP telephony, use relatively simple linear and non-linear feedback shift registers to provide the output key sequences. Although such techniques provide reasonable levels of security and are typically less computationally intensive, they are often inflexible in their structure and with respect to the privacy provided. As a result of these and other deficiencies, prior encryption techniques are inadequate to meet the requirements associated with IP telephony and other communications within communications networks.

SUMMARY OF THE INVENTION

According to the present invention, disadvantages and problems associated with encryption in a communications network are substantially reduced or eliminated.

According to one embodiment of the present invention, in a communications system, two or more end stations coupled to a network participate in a communications session with one another using the network. Each end station includes an encryptor having at least a first linear feedback shift register (LFSR) and at least an associated first interconnect mask of a length not longer than the length of the first LFSR. At one end station, the encryptor generates an output sequence using the first LFSR and the first interconnect mask. An interconnect mask table contains polynomials that correspond to available interconnect masks. The end station receives a session key specifying the first interconnect mask. The end station uses the output sequence of the encryptor to encrypt an information stream during the session. In a more particular embodiment, the network includes a local area network (LAN) supporting Internet Protocol (IP) and end stations use real time protocol (RTP) to communicate audio information streams.

The present invention provides a number of important technical advantages. Unlike prior encryption techniques used for transferring information streams between computers, which typically involve computationally intensive encipherment techniques and provide a higher level of security than typically needed for IP telephony, encryption according to the present invention may be less computationally intensive. In addition, LFSRs of any length may be used up to the maximum length of the underlying hardware or machine without increasing processing requirements. Also unlike computationally simpler prior encryption techniques that use linear or non-linear feedback shift registers to provide the output key sequences, the present invention provides a flexible structure that may adapted as appropriate to provide a desired level of privacy.

The use of pointers to specify interconnect maps greatly expands the number of potential combinations of interconnect maps, substantially increasing the security that may be provided. In addition, multiple sets of interconnect maps may be used to provide different security modes depending on the particular end station and the nature of the session. Furthermore, the use of pointers, possibly to specify interconnect maps longer than the lengths of the pointers, increases the effective length of the session key. The session key may be any suitable length according to the desired security level, regulatory restrictions on session key length, and other particular needs. The session key structure of the present invention further increases the effective length of the session key. As a result of these and other important technical advantages, the present invention is well suited for IP telephony and other types of communications. Other technical advantages are readily apparent to those skilled in the art.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
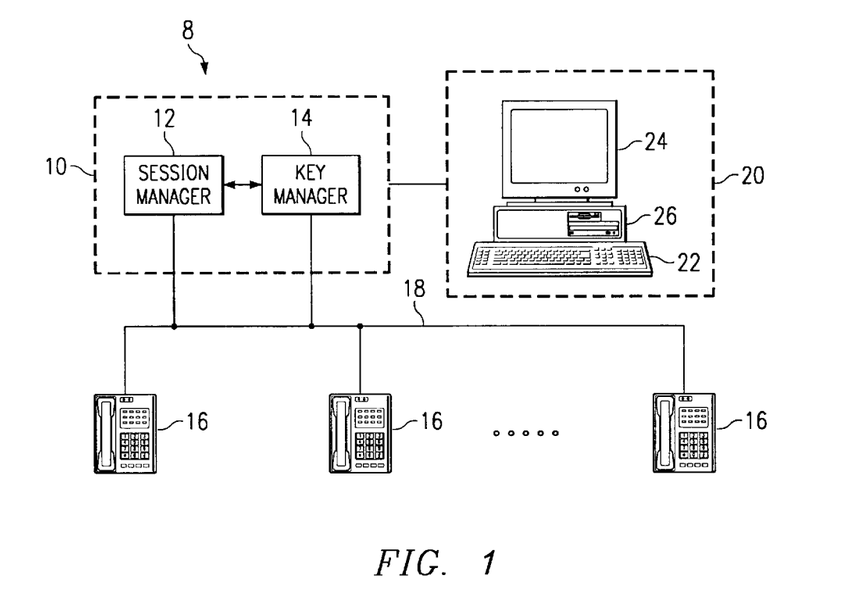
FIG. 1 illustrates an exemplary system that includes a call manager, a key manager, and multiple end stations that communicate using a network according to the present invention.

FIG. 1 illustrates an exemplary system 8 that includes at least one manager 10, a suitable number of end stations 16, and a telecommunications network 18 coupling manager 10 and end stations 16. Manager 10 includes at least one call manager 12 and at least one key manager 14 that is integral to or separate from call manager 12. End stations 16 may each include one or more computers, telephones, videophones, wireless handsets, or any other suitable network components, in any suitable combination, that communicate digital signals associated with voice, data, video, or other information streams. Network 18 may be a local area network (LAN), a metropolitan area network (MAN), a wide area network (WAN), a global network such as the Internet, a virtual private network (VPN), or any other appropriate data communications network. In a particular embodiment, at least some end stations 16 communicate Internet Protocol (IP) telephony signals associated with voice, data, video, or any other suitable information streams using network 18 and subject to appropriate input from call manager 12 and key manager 14. Key manager 14 may communicate directly with end stations 16 or may communicate with end stations 16 through call manager 12 and any other appropriate components. Where appropriate, these communications may further involve real time protocol (RTP) or other suitable protocol to operate in association with IP. Although IP telephony is primarily discussed, those skilled in the art will appreciate that the present invention may apply similarly to a variety of other digital communications applications and that the present invention encompasses all such applications.

Call manager 12 and key manager 14 operate on one or more computers 20 that include an input device 22, such as a keypad, touch screen, microphone, or other device to accept information. An output device 24 may convey information associated with the operation of system 10, including digital or analog data, visual information, or audio information. Input device 22 and output device 24 may support any suitable fixed or removable storage media, such as magnetic computer disks, CD-ROMs, or other media to receive output from and provide input to system 8. Computer 20 further includes a processor 26 and associated volatile or non-volatile memory for executing instructions and manipulating information according to the operation of system 8. Call manager 12 and key manager 14 may be embodied in computer software, in computer hardware, or in any appropriate combination of hardware and software, and may be integral to or separate from one another, according to particular needs.

Figure 2:
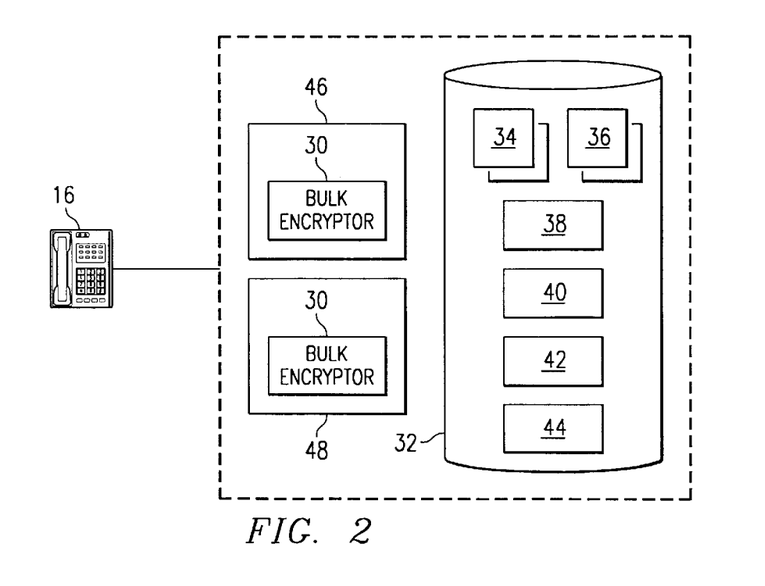
FIG. 2 illustrates exemplary components of an end station according to the present invention.

FIG. 2 illustrates exemplary components of end station 16, which include a transmitter 46, a receiver 48, and a database 32. Transmitter 46 and receiver 48 each include a bulk encryptor 30 for encryption and decryption, respectively, of the voice or other information streams communicated with other end stations 16. In general, each of these bulk encryptors 30 uses an arrangement of linear feedback shift registers (LFSR) and associated interconnect masks to generate cryptographically sound pseudo-random number output sequences. These output sequences are then used to encrypt or decrypt the voice or other information streams transmitted to or received from, respectively, the other end stations 16. Although end stations 16 may use any suitable communications protocol, in a particular embodiment end stations 16 communicate with one another over network 18 using at least RTP over IP.

Database 32 contains one or more interconnect mask tables 34 and one or more pointer tables 36, which collectively provide a large number of potential interconnect masks for the operation of LFSRs within bulk encryptors 30, without requiring that the selected interconnect masks themselves be transmitted as part of the communications session key. In one embodiment, one interconnect mask table 34 and one pointer table 36 is associated with each LFSR in bulk encryptors 30. In general, a selected pointer from table 36 specifies a particular interconnect mask from table 34, which may then be used with a corresponding LFSR to generate an output, in the manner described more fully below with reference to FIGS. 3 and 4. The present invention contemplates pointer table 36 being a null table, system 8 operating without using pointer table 36, or system 8 not including pointer table 36, if appropriate.

In one embodiment, database 32 also contains the following four keys used in connection with specified operations of end station 16, without limitation: (1) a current master configuration public key 38 of a current master configuration public/private key set, (2) an end station private key 40 of an end station public/private key set, (3) a current master sequence key 42, and (4) a universal override key 44. Keys 38, 40, 42, and 44 may be stored in database 32 in an encrypted format. Although keys 38, 40, 42, and 44 are described, more or fewer keys may be stored in database 32. The present invention contemplates any suitable keys for any suitable purposes to support the operation of system 8 and its components.

As described below, keys 38 and 40 are used in the key management protocol used within system 8. End station 16 uses current master configuration public key 38 to decrypt and authenticate certain key management commands from key manager 14. End station 16 stores the public key portion of the key set and key manager 14 maintains the private key portion. The current master configuration public/private key set may use the publicly available ElGamal or another suitable public/private key encryption algorithm. End station 16 uses end station private key 40 to decrypt and also to authenticate key modification related messages and key management error reports received from key manager 14. End station 16 maintains the private key portion of the key set and key manager 14 maintains the public key portion. The end station public/private key set uses the same public key cryptographic system as key manager 14.

Current master sequence key 42 is used to decode cryptographic initialization messages associated with a communications session between end stations 16. This may include decryption and authentication of a temporary key received from key manager 14 for use in exchanging partial keys for the session. Current master sequence key 42 may use the publicly available Blowfish or any other appropriate key structure. Universal override key 44 allows end station 16 to be initially programmed at a customer site or otherwise. In one embodiment, key 44 is a universal key capable of overriding some or all other security procedures at end station 16, such that its use should be substantially limited if security is to be preserved. In a particular embodiment, key 44 may be used only if all other keys 38, 40, and 42 are set to all zeros.

Figure 3:
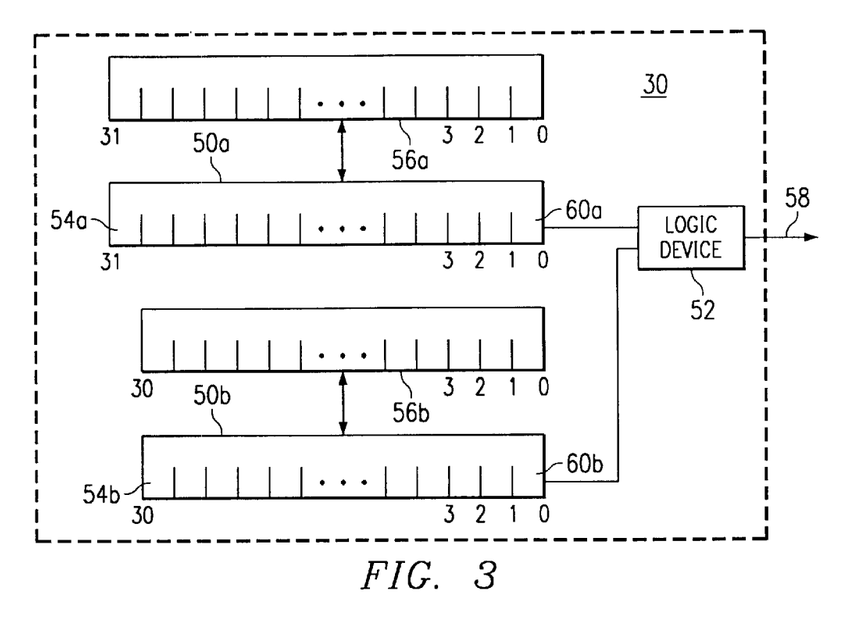
FIG. 3 illustrates an exemplary bulk encryptor according to the present invention.

FIG. 3 illustrates an exemplary bulk encryptor 30 that includes at least first Galois configuration LFSR 50a, second Galois configuration LFSR 50b, and a suitable logic device 52, which are collectively arranged to provide a "shrinking generator" as described more fully below. LFSRs 50a and 50b may be referred to in the singular as LFSR 50 or in the plural as LFSRs 50, as appropriate. Like other Galois LFSRs, LFSRs 50 are implemented as right shift registers rather than as left shift registers, such that LFSRs 50 may each be handled in its entirety as a single entity rather than one bit at a time. In addition, after a shift operation is performed within LFSR 50, the bit inserted into the least significant bit (LSB) position 54 of LFSR 50 is inserted as an element of associated interconnect mask 56. This additional refinement allows the associated shift and insert operations for LFSR 50 to be performed as a single step. As described below, bulk encryptor 30 yields an encryptor set that in one embodiment depends only on the lengths of LFSRs 50, on their initial state values, and on the contents of the associated interconnect masks 56. As a result, security may be customized during the operation of system 10 without requiring code to be modified programmatically.

For a typical Galois LFSR, if the most significant bit (MSB) output from the LFSR is a "1," an XOR operation is first performed with all the bits of the LFSR and all the bits of an associated interconnect mask. An interconnect mask polynomial specifies which bits of the interconnect mask are set equal to "1" rather than to "0." For example, if the interconnect mask had a "1" at only the second, third, and seventh bit positions according to the corresponding interconnect mask polynomial, then the XOR operation would include an XOR with the "1" located at each of the second, third, and seventh bit positions in the interconnect mask and the corresponding second, third, and seventh bits within the LFSR. The XOR operation would also include an XOR with the "0" located at each of the other bit positions in the interconnect mask and the corresponding bits within the LFSR. Second, after the XOR operation, the bits within the LFSR are shifted one position. Third, the "1" output from the LFSR is inserted into the LSB position of the LFSR to complete one operations cycle. If the output bit of the LFSR is a "0" rather than a "1," no XOR operation is performed and the bits within the LFSR are simply shifted one position and the "0" that is output from the LFSR is inserted into the LSB position of the LFSR to complete one operations cycle. Successive operations cycles may proceed essentially indefinitely to generate an output from the LFSR for subsequent transmission to another component.

In one embodiment, as discussed above, LFSR 50 may (but is not required to) incorporate a refinement to the operation of a typical Galois LFSR. If the output bit 60 from LFSR 50 has "1" as its value, an XOR operation is performed with all the bits of LFSR 50 and corresponding bits in associated interconnect mask 56. At essentially the same time, a "1" is inserted into the LSB position of LFSR 50 as an element of the interconnect mask 56, such that the first and third operations of a typical Galois LFSR are combined into a single operation. The bits of LFSR 50 are then shifted one position as in a typical Galois LFSR. In the alternative, if output bit 60 has "0" as its value, then no XOR operation is performed. Instead, a "0" is inserted into the LSB position of LFSR 50 and the bits of LFSR 50 are shifted one position as in a typical Galois LFSR. The present invention contemplates operations of LFSR 50 occurring in any appropriate order, according to particular needs, to generate an output from LFSR 50 suitable for communication to logic device 52.

Figure 4:
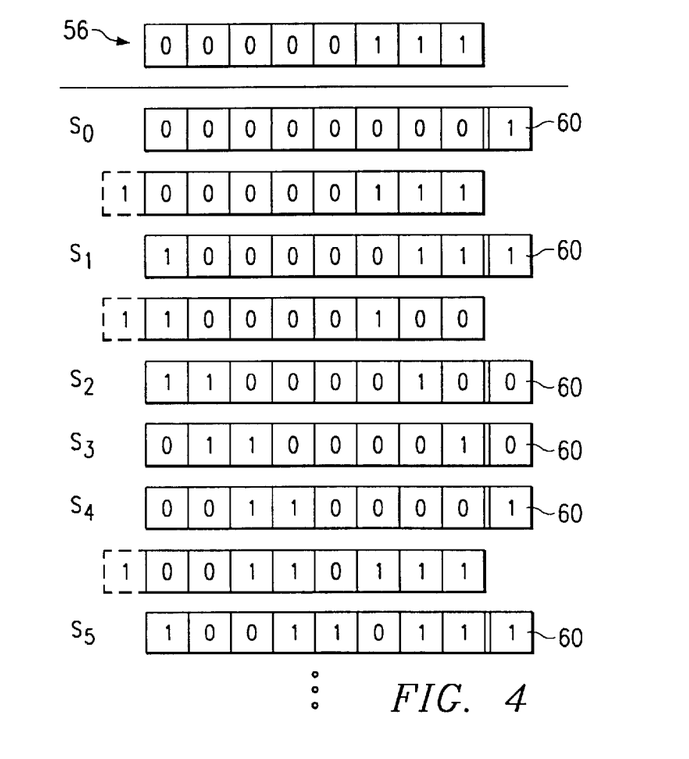
FIG. 4 illustrates exemplary operations for a linear feedback shift register, and associated interconnect mask, according to the present invention.

FIG. 4 illustrates exemplary operations for an exemplary 8 bit LFSR 50 and associated 8 bit interconnect mask 56, assuming for purposes of this example only that LFSR 50 begins at state zero ($S_0$) with "0" in all its bit positions, that "1" is the output bit 60 just output from LFSR 50, and that interconnect mask 56 has "1" in only its first three bit positions (MSB first). Since output bit 60 for state zero is "1," an XOR operation is performed with the bits of LFSR 50 and corresponding bits of interconnect mask 56, the resulting values are stored in LFSR 50 along with a "1" in the LSB position, and the contents of LFSR 50 are then shifted one position to generate state one ($S_1$), the next state. Similarly, since output bit 60 for state one is "1," an XOR operation is performed with the bits of LFSR 50 and corresponding bits of interconnect mask 56, the resulting values are stored in LFSR 50 along with a "1" in the LSB position, and the contents of LFSR 50 are again shifted one position to generate state two ($S_2$), the next state. Since output bit 60 for state two is "0," no XOR operation is performed. The bits of LFSR 50 are simply be shifted one position and a "0" inserted in the LSB position to generate state three ($S_3$), the next state. As discussed above, the operations of LFSR 50 may continue in a similar manner essentially indefinitely to generate an output for communication to logic device 52.

Referring back to FIG. 3, for strong encryption, output sequence 58 of bulk encryptor 30 should be substantially random. In one embodiment, according to logic device 52, a particular bit of output sequence 58 equals output bit 60a from first LFSR 50a if and only if the corresponding output bit 60b of second LFSR 50b has "1" as its value. In other words, if output bit 60b of second LFSR 50b has "1" as its value, then output bit 60a of first LFSR 50a is communicated from logic device 52 within output sequence 58. Conversely, if output bit 60b of second LFSR 50b has "0" as its value, then output bit 60a of first LFSR 50a is not communicated in output sequence 58, such that no new bit is added to output sequence 58. Logic device 52 may be a JK flip-flop or any other logic device appropriate to accomplish this result. Using LFSRs 50, associated interconnect masks 56, and logic device 52, bulk encryptor 30 behaves as a shrinking generator to provide a non-linear combining capability that effectively converts LFSRs 50, which are predictable and readily solvable when taken singly, into a non-linear feedback shift register that is less predictable and less readily solvable.

Other techniques for generating an aperiodic or otherwise essentially random output sequence 58 may be used within bulk generator 30. For example, logic device 52 might use output bit 60b of LFSR 50b to determine how many output bits 60a of LFSR 50a to discard before selecting a bit for communication in output sequence 58. Those skilled in the art will appreciate that any suitable technique may be used to convert the linear outputs of LFSRs 50 to a non-linear output sequence 58. Although the technique described herein may be considered preferable in certain circumstances, according to particular needs, interconnect mask tables 34, pointer tables 36, and the key structure of the present invention do not require that any particular logic device 52 be used within bulk encryptor 30.

If the lengths of LFSRs 50 are the same, both will return to their initial states at the same time, after $2^{Ln}-1$ total states, where for example Ln is the length of first LFSR 50a and LFSR 50b is not longer than LFSR 50a. As an example, if both LFSRs 50 are 16 bit LFSRs and the interconnect mask 56 used is of maximal length (16 bits in length), both LFSRs 50 would return to their initial states after only $2^{16}-1$ states. Similarly, if first LFSR 50a is a 16 bit LFSR and second LFSR 50b is an 8 bit LFSR, then first LFSR 50a would return to its initial state at the same time second LFSR 50b was returning to its initial state for the second time, again yielding only $2^{16}-1$ total states. However, if the LFSRs 50 are of different and relatively prime lengths, the number of total states and therefore the effective length of output sequence 58 of the shrinking generator may be dramatically increased. In the general case where the lengths of LFSRs 50 are relatively prime, output sequence 58 has an effective length of $2^{L_n+L_m}$ bits, where $L_n$ is the length of first LFSR 50a and $L_m$ is the length of second LFSR 50b. For example only and not by way of limitation, if first LFSR 50a is a 16 bit register and second LFSR 50b is a 15 bit register, LFSRs 50 will each simultaneously return to their initial state only after a total of $2^{31}$ states have occurred. As a result, the effective length of output sequence 58 and therefore the difficulty with which it may be solved is dramatically increased without lengthening LFSRs 50.

Bulk encryptor 30 of the present invention provides a shrinking generator that incorporates LFSRs 50 of relatively prime lengths to increase the number of total states and the effective length of output sequence 58. In a particular embodiment, first LFSR 50a is a 31 bit LFSR and second LFSR 50b is a 30 bit LFSR. These particular lengths have the following desirable characteristics, without limitation: (1) they are relatively prime, (2) they are shorter than 40 bits in length, which allows the session key of the present invention to satisfy the 40 bit length constraint set forth in currently applicable United States export control guidelines, and (3) while end stations 16 may support any appropriate processor, these lengths provide resulting combinations as single register operations on commercially available processors supporting 64 bit operations. Using 31 bit first LFSR 50a and 30 bit second LFSR 50b, the effective length of output sequence 58 becomes approximately $2.305843009214^{18}$ bits. At a bit rate of 64 kbps, typical for many voice communication environments, this length would translate to approximately 1,144,818 years of conversation before output sequence 58 begins to repeat. Moreover, using the key structure of the present invention described below, assuming exemplary values for the parameters involved, approximately 75,026,794,067 years of conversation may be sustained before exhausting all available sequences. Although 31 bit LFSR 50a and 30 bit LFSR 50b are described, the present invention contemplates LFSRs 50 of any suitable lengths according to particular needs.

Figure 5:
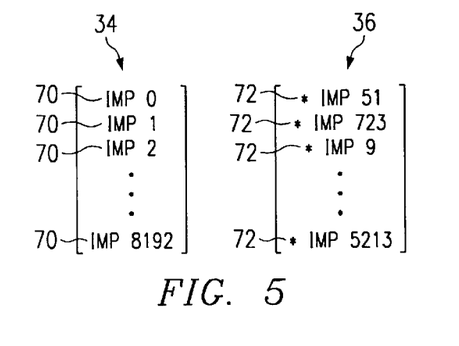
FIG. 5 illustrates exemplary interconnect mask and pointer tables according to the present invention.

FIG. 5 illustrates an exemplary interconnect mask table 34 and pointer table 36 corresponding to one or more LFSRs 50. In one embodiment, as discussed above, each LFSR 50 has its own associated interconnect mask table 34 and pointer table 36, although the present invention contemplates any suitable number of tables 34 and 36 according to particular needs. In a particular embodiment, interconnect mask table 34 may contain 8192 or another suitable number of interconnect mask polynomials (IMP) 70 that are available for use with the corresponding LFSR 50. Polynomials 70 are each stored in table 34 as a bit pattern corresponding identically or in any other appropriate manner to a particular interconnect mask 56. Polynomial 70 determines which bits of interconnect mask 56 are set equal to "1" rather than "0," which will affect the contents of LFSR 50 and thus output sequence 58 as a result of the XOR operations described more fully above. In one embodiment, interconnect mask table 34 contains polynomials 70 with the same length as the corresponding LFSR 50, referred to as maximal length polynomials. For example only and not by way of limitation, where LFSR 50a is 31 bits in length and LFSR 50b is 30 bits in length, table 34 for LFSR 50a may contain 31 bit maximal length polynomials 70 and table 34 for LFSR 50b may contain 30 bit maximal length polynomials 70.

End station 16 uses pointers 72 stored in pointer table 36 to select a particular interconnect mask polynomial 70 from table 34. In a particular embodiment, pointer table 36 contains 256 or any other appropriate number of pointers to interconnect mask polynomials 70. Although pointers 72 may be generated and stored in any appropriate manner, generating pointers 72 randomly for storage in table 36 will in general decrease the chance that a malicious or other listener is able to identify the particular interconnect polynomial 70 being used in bulk encryptor 30. Polynomial 70 may be selected from table 34 according to the following algorithm:

$$\text{Polynomial}=\text{Table}_{mask}[\text{Table}_{pointer}[\text{Selector}]]$$

where:

Selector=the value used to select pointer 72;

$\text{Table}_{pointer}$=pointer table 36;

$\text{Table}_{mask}$=interconnect mask table 34; and

Polynomial=the selected interconnect mask polynomial 70

In the particular embodiment in which 8192 interconnect mask polynomials 70 are stored in table 34, the selection of a particular polynomial 70 directly from table 34 would require a 13 bit word ($2^{13}$=8192). Since in one embodiment one such 13 bit word would be required for each LFSR 50, direct selection of polynomials 70 can potentially be very costly in terms of bit budget where a large number of available polynomials 70 are desired. This may be particularly true in light of currently applicable United States export control guidelines setting forth a 40 bit maximum session key length. Since the pointer table 36 may include fewer pointers 72 than there are available polynomials 70 in table 34, fewer bits are required to specify each polynomial 70 for use within bulk encryptor 30 without decreasing security. For example, in the particular embodiment where pointer table 36 contains 256 pointers 72, an 8 bit word is required to identify a particular pointer 72 and thus a particular polynomial 70. Even providing two such 8 bit words, one for each LFSR 50, substantial bit savings are achieved such that the session key length is effectively increased for a similar level of security, providing an important technical advantage.

In one embodiment, interconnect mask table 34 is stored in permanent memory during manufacture of end station 16 or at any other time, and is not typically modified during operation of system 10, while pointer table 36 may be modified and periodically communicated to end station 16 from key manager 14 during operation of system 10. This allows a large number of potential interconnect polynomials 70 to be used without requiring that they all be downloaded each time the key space is changed. Furthermore, even if a malicious or other listener were to intercept an update to pointer table 36, the actual interconnect polynomials 70 would remain secret since they may not be exposed to transmission between end stations 16. Moreover, as described below, the updates to pointer table 36 may themselves be encrypted for communication from key manager 14 to end stations 16, using a public/private key structure or otherwise, further enhancing security.

As described above, each interconnect mask table 34 may contain any suitable number of polynomials 70 according to the particular security needs of the organization associated with system 10. In addition, different interconnect mask tables 34 may be used in different situations, again according to particular needs. For example, to further increase the security of communications internal to an organization, rather than wholly or partially external to the organization, a different set of tables 34 may be used for such communications. Because LFSRs 50 are Galois LFSRs that may each be processed in its entirety as a single step, their lengths may be increased to the extent necessary to accommodate associated interconnect masks 56 and provide a desired level of security. In one embodiment, the bit lengths of LFSRs 50 are constrained only by the maximum length allowed by the processor on which bulk encryptor 30 is operating.

For example only and without limitation, bulk encryptor 30 might include 64 bit LFSRs 50, and associated maximal length 61 bit and 60 bit polynomials 70, respectively, might be stored in first tables 34 for internal communications. In addition, maximal length 31 bit and 30 bit polynomials 70 might be stored in second tables 34 for external communications. Unlike communications involving an end station 16 that is external to the organization, which require that such an external end station 16 know the available polynomials 70 and the pointers 72 to these polynomials 70, communications between end stations 16 internal to an organization will not require distribution of this information outside the organization. Other situations in which tables 34 of different lengths may be desirable to provide variable security will be apparent to those skilled in the art. The present invention contemplates multiple sets of tables 34 in any number and for any appropriate purposes.

Figure 6:
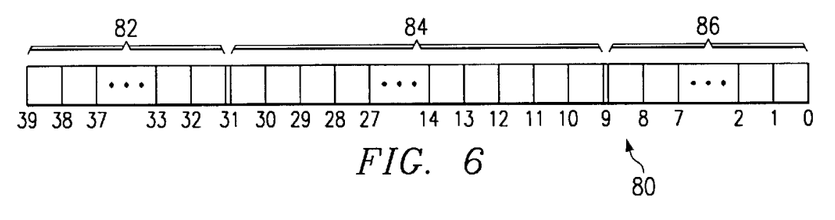
FIG. 6 illustrates an exemplary session key according to the present invention.

FIG. 6 illustrates an exemplary communications session key 80 conforming to currently applicable United States export control guidelines, which set forth a 40 bit maximum key length for "symmetric key" cryptography. In one embodiment, session key 80 is a substantially random bit set arranged as five octets. The first octet 82 is used to select the specific polynomial 70 to be used within bulk encryptor 30 as interconnect mask 56 for LFSR 50a. First octet 82 is an index to a selected pointer 72 in table 36 for LFSR 50a, which specifies a corresponding interconnect mask polynomial 70 in table 34 for use in connection with LFSR 50a. The remaining 32 bit portion of session key 80, including the second through fourth octets 84 and the fifth octet 86, is masked (with 0x7FFFFFFF or otherwise) to yield the number of bits appropriate for initialization of LFSR 50a. In the particular embodiment where LFSR 50a is a 31 bit LFSR, the initial state of LFSR 50a may include $B_{30}$ through $B_0$, with $B_{31}$ omitted. In this embodiment, first octet 82 may be referred to as the first pointer portion of session key 80 and the remainder of session key 80 may be referred to as the first initial state portion.

Analogously, the fifth octet 86 is used to select the specific polynomial 70 to be used within bulk encryptor 30 as interconnect mask 56 for LFSR 50b. Fifth octet 86 is an index to a selected pointer 72 in table 36 associated with LFSR 50b, which specifies a corresponding interconnect mask polynomial 70 in table 34 for use with LFSR 50b. The remaining 32 bit portion of key 80, including second through fourth octets 84 and first octet 82, may be masked (with 0x3FFFFFFF or otherwise) to yield the number of bits suitable to initialize LFSR 50b. In a particular embodiment where LFSR 50b is a 30 bit LFSR, the initial state of LFSR 50b may include $B_{37}$ through $B_8$, with $B_{39}$ and $B_{38}$ being omitted. In this embodiment, fifth octet 86 may be referred to as a second pointer portion of session key 80 and the remainder of session key 80 may be referred to as the second initial state portion. At least in part as a result of this key structure, LFSRs 50 begin in different initial states and will not each simultaneously return to its initial state until, in this particular example, $2^{61}$ total states have occurred.

Although 40 bit session key 80 is described, the present invention contemplates session key 80 having any suitable length and further contemplates portions of session key 80 being used in the manner described above or in any other appropriate manner. According to the present invention, 40 bit session key 80 is in a particular embodiment effectively expanded into at least a 77 bit key structure as follows: (1) an 8 bit index into each of two pointer tables 36, and (2) 31 bit and 30 bit initial states for LFSRs 50a and 50b, respectively. Since pointer tables 34 may be modified, session key 80 represents a true 77 bit session key. Furthermore, if the structure and relationship between tables 34 and 36 are considered, key 80 is effectively expanded into an 87 bit key structure in this particular embodiment, since the indexes to pointer tables 36 effectively specify one of 8192 ($2^{13}$=8192) interconnect mask polynomials 70. An 87 bit key structure may exist as follows: (1) a 13 bit polynomial specified in each of two interconnect mask tables 34, and (2) 31 bit and 30 bit initial states for LFSRs 50a and 50b, respectively. The present invention is capable of providing these benefits while satisfying currently applicable regulatory limits on the length of session key 80, providing another important technical advantage over previous techniques.

Figure 7:
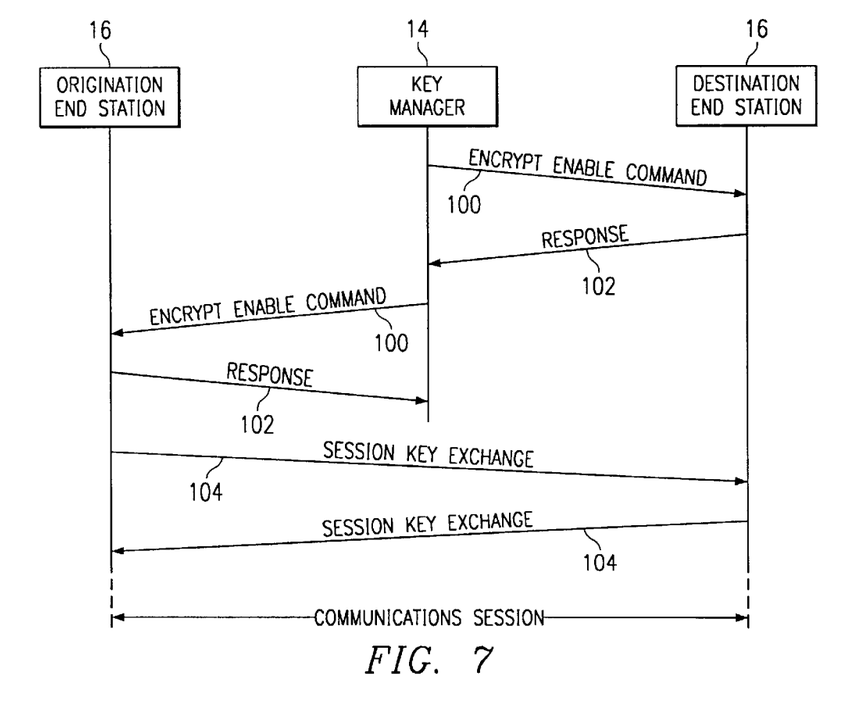
FIG. 7 illustrates an exemplary message flow between a key manager and end stations for a communications session.

FIG. 7 illustrates an exemplary message flow between key manager 14 and end stations 16 for a communications session between two end stations 16. To initiate secure communications, key manager 14 sends encrypt enable command message 100 to each end station 16 using network 18 in response to a connection being established between end stations 16. Message 100 contains the Media Access Control (MAC) and IP addresses for both end stations 16, along with a random number or other appropriate temporary key that end station 16 may use to communicate with the other end station 16. In one embodiment, message 100 is encrypted using the "Blowfish" or another suitable algorithm and is keyed using current master sequence key 42. Upon receipt of message 100, each end station 16 sends an encrypt enable response message 102 to key manager 14 using network 18 to acknowledge receipt of the temporary key. In the alternative, if an end station 16 detects an error associated with the temporary key or its transmission, end station 16 may send response message 102 to key manager 14 indicating the error, along with any suitable diagnostic information.

In one embodiment, the same temporary key is issued to each end station 16. The destination end station 16 receives the encrypt enable command message 100 from key manager 14 first and responds to key manager 14 with encrypt enable response message 102. Key manager 14 then sends the originating end station 16 its message 100 and awaits a response message 102. Although other suitable sequencing schemes may be used according to particular needs, the scheme described above provides sequencing suitable to properly begin the session.

Once both end stations 16 have properly received the temporary key from key manager 14, end stations 16 send session key exchange messages 104 to one another using network 18. In one embodiment, each session key exchange message 104 contains the MAC and IP addresses of both end stations 16, along with a random bit stream of specified length as the partial session key. Message 104 may be encrypted using the Blowfish or any other appropriate algorithm and keyed with the previously received temporary key. To allow for an orderly initialization of bulk encryptors 30, originating end station 16 sends its message 104 first and awaits message 104 from the destination end station 16. For purposes of authentication, end station 16 receiving a message 104 examines the addressing information contained in the message against information for the other end station 16 that call manager 12 has specified. If message 104 properly authenticates, the received partial session key and the locally generated partial session key are algorithmically combined at end station 16, using a secure hash operation or otherwise, to generate session key 80. If end station 16 detects an authentication error, end station 16 sends an error message to key manager 14 indicating the error and the session is terminated. The error message may be encrypted using end station private key 40 or in any other suitable manner.

As a part of the connection process, end station 16 must receive session key 80 for use in its bulk encryptors 30. It is possible and may be desirable in some cases that session key 80 used to encrypt the information stream from first end station 16 to second end station 16 be different from session key 80 used to encrypt the information stream in the opposite direction. In any case, session keys 80 should be kept secret and their sources should be verifiable. In one embodiment, each session key 80 may be generated as one or more random bit streams, a digital signature is appended to session key 80 containing the date, time, source, and key hash encrypted with the private key of key manager 14, and the entire package is encrypted with the end station public key. This technique may require that end station 16 decrypt the package twice, but is suitable to provide desired authentication and privacy.

A side consideration of this technique is that it may provide a point at which an archival copy of session key 80 may be created and preserved for later law enforcement processing. In addition to archival storage of session key 80, it may be desirable for a similar purpose to archive the contents of pointer tables 36. Where law enforcement processing is to be supported in this manner, the lifespan of the archival copies should in general be long enough to provide a reasonable time for the legal process to operate but not infinite, for example only and not by way of limitation, several weeks.

Within transmitter 46 of a first end station 16, to begin communicating a voice or other appropriate information stream to a second end station 16, appropriate portions of session key 80 are loaded into LFSRs 50 of bulk encryptor 30 in the manner described above to provide their initial states. Session key 80 also specifies interconnect masks 56 for LFSRs 50 in the manner described above. Upon receiving a frame of data to be transmitted to second end station 16, transmitter 46 appends an encryption header to the front or elsewhere within the frame and then encrypts the data and associated header using the output sequence 58 of bulk encryptor 30. In one embodiment, the encryption header contains, in any combination and without limitation: (1) a sync loss flag used to indicate that first end station has lost cryptographic synchronization, (2) a sequence counter used to confirm cryptographic synchronization, and (3) a valid data count that allows receiver 48 of second end station to delete any packing data. Once encrypted, the data and appended header are sent to a driver within transmitter 46 for transmission to second end station 16.

Within receiver 48 of second end station 16, each transmitted frame is received and the associated frame number is checked to determine whether one or more frames have been skipped. If no frames are found to be missing, the current frame is decrypted using output sequence 58 of associated bulk encryptor 30. If one or more frames are found to be missing, at least LFSR 50a, the encoding LFSR within bulk encryptor 48, may be advanced a suitable number of frames and the decryption sequence resumed. Using RTP for voice or other information streams communicated between end stations 16 may contribute to the ability of receiver 48 to be advanced a specified number of frames in this manner.

After a frame is decrypted, receiver 48 may examine the encryption header to determine whether the decryption was successful. If an error is detected, receiver 48 may set a sync loss flag or other suitable indicator in the next or any other available frame to be transmitted to first end station 16. Loss of cryptographic synchronization is defined as a condition in which the received and decrypted sequence count does not match the expected value. Upon detection of this condition, receiver 48 enters a sync loss state in which it reports a sync loss condition to transmitter 46 so that the sync loss flag can be asserted to first end station 16. In one embodiment, while in the sync loss state, receiver 48 attempts to reestablish cryptographic synchronization by decrypting each received frame with the known initial state of LFSR 50a until it detects a frame with a sequence number of 0x01. If this is detected, cryptographic synchronization is restored.

In one embodiment, upon receipt at first end station 16 of a frame containing a sync loss flag or other indicator of unsuccessful decryption, transmitter 46 of first end station 16 resets at least LFSR 50a, the encoding LFSR in bulk encryptor 30, to its initial state and uses the corresponding key sequence to transmit subsequent frames to second end station 16. Transmitter also resets the sequence counter to 0x01. Transmitter 46 enters a resynchronization mode in which it will reset LFSR 50a to its initial state and reset the sequence counter to 0x01 every n frames unless the sync loss flag is cleared, where n is some suitable predetermined integer. This allows receiver 48 of second end station 16 multiple chances to detect the initial state. In a particular embodiment, the value of n is one plus the maximum RTP queue depth.

Receiver 48 at second end station 16 also enters a resynchronization mode in which it attempts to use the initial state to decrypt each new frame as it arrives. In one embodiment, if receiver 48 is unable to successfully decrypt any frame after 4n tries, receiver 48 assumes receiver 48 at first end station 16 has similarly lost cryptographic synchronization. Receiver 48 at second end station 16 forces the associated transmitter 46 at second end station 16 into resynchronization mode by setting the sync loss flag to the asserted state. After a maximum of m*4n frames, where m is some predetermined integer, receiver 48 at second end station 16 assumes resynchronization is not possible and causes the session to be terminated. In a particular embodiment, m equals four. While receiver 48 is in the sync loss state, no frames may be forwarded to the higher layers. Where the information stream is voice, this results in a listener hearing silence rather than noise.

When transmitter 46 at first end station 16 detects or is otherwise informed that the sync loss flag has been cleared and thus that cryptographic synchronization has been reestablished, transmitter 46 returns to normal operating mode. Although initially both end stations 16 use the same point in the key sequence, this is not a requirement. For example, after a successful resynchronization attempt, the key sequence in place at first end station 16 for communications to second end station 16 will most likely be different than the key sequence in place at second end station 16 for communications to first end station 16. The encryption and decryption processes for information flowing in each direction are separate and independent.

Key management is an important yet often difficult issue within cryptographic systems, particularly where limited computing power is present in end stations 16. For example only and not by way of limitation, where end stations 16 are voice over IP (VoIP) telephones, rather limited computing power may exacerbate key management difficulties. In an effort to overcome this problem, use of public key encryption may be limited to communication between key manager 14 and end stations 16 during operation of the key management protocol. This use of public key encryption may allow less computationally intensive algorithms, such as those described above according to the present invention, to be used for encryption of the actual voice or other information streams communicated between end stations 16 during a session. This may represent some degradation of security, since verification of the source of the partial session key is not inherently contained within the actual messages sent between end stations 16. However, for the security level typically associated with at least some privacy enhanced communications, such as typical LAN-based IP telephony, this may generally not be a significant problem.

FIGS. 8A through 8D illustrate exemplary message flows between the key manager 14 and end stations 16 for key management operations. These protocols allow key related information to be updated in the field, programmatically or otherwise, and provide a reasonably secure environment for operation of system 8 without incurring unduly large processing overheads.

Figure 8A:
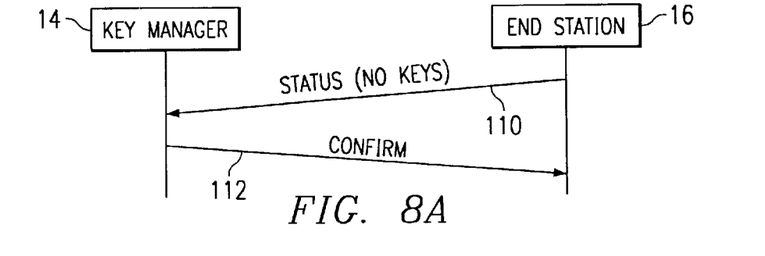
FIGS. 8A through 8D illustrate exemplary message flows between a key manager an end station for key management operations.

Referring to FIG. 8A, keys 38, 40, and 42 within database 32 may be set to all zeros when end station 16 is manufactured or otherwise. End station 16 may detect this configuration during the power-up or restart sequence and initiate a process that allows keys 38, 40, and 42 to be initialized. When end station 16 registers with call manager 12, end station 16 sends a status message 110 to key manager 14 reporting the fact that end station 16 currently has no usable keys. In one embodiment, message 110 is encrypted using the default current master configuration public key 38 and contains a timestamp, a new end station public key corresponding to end station private key 40, and the MAC and IP addresses of end station 16. Upon receipt of message 110, key manager 14 sends a confirm message 112 to end station 16. In one embodiment, message 112 contains, without limitation: (1) the new current master configuration public key 38, (2) a timestamped digital certificate keyed with the current master configuration private key, and (3) the MAC and IP addresses of key manager 14. Message 112 may be encrypted in its entirety using the default current master configuration private key.

When key manager 14 determines that one or more keys 38, 40, or 42 in database 32 should be updated or otherwise modified, whether at initialization or at any other time, key manager 14 sends a key management command message 120 to end station 16 over network 18. Message 120 contains at least one of the following commands, without limitation: (1) generate a new end station public/private key set, (2) overwrite current master configuration public key 38 with a value provided, (3) overwrite current master sequence key 42 with a value provided, or (4) clear keys 38, 40, and 42 to all zeros. The commands within message 120 may be encrypted using the publicly available ElGamal or any other suitable algorithm, keyed with the master configuration private key, and authenticated using master configuration public key 38 stored within end station 16. If properly authenticated, end station 16 executes the command contained within the key management command message 120.

Figure 8B:
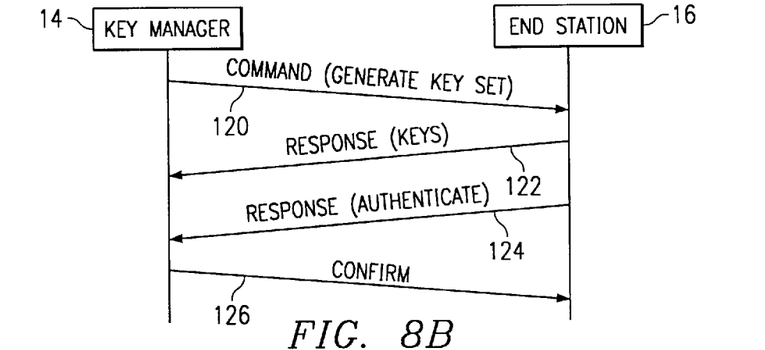

Referring to FIG. 8B, the first command associated with command message 120 allows key manager 14 to instruct end station 16 to generate a new end station public/private key set for use in suitable authentication procedures. Message 120 may be encrypted using the current master configuration private key as the encryption key. If end station 16 is able to authenticate the command, end station 16 uses the ElGamal or another suitable key generation procedure to create a new end station public/private key set. Once generated, end station private key 40 of this key set is stored in database 32. End station 16 sends a response message 122 to key manager 14 containing the new public key of this key set and the previously known end station private key 40. Message 122 may be encrypted using current master configuration public key 38 according to the ElGamal or any other appropriate algorithm.

End station 16 also sends another response message 124 (this time without the new public key of the end station public/private key set) to key manager 14, encrypted using end station private key 40, in an attempt to verify that key manager 14 properly received and authenticated the new public key of this key set. In one embodiment, message 124 includes the MAC and IP addresses of end station 16 in a timestamped digital certificate format. Key manager 14 then attempts to authenticate this information and, if successful, stores the information in memory. Key manager 14 will also send a confirm message 126 to end station 16, encrypted with current end station private key 40, confirming its receipt of message 124. If the described authentication sequence fails, report of the failure is sent to the last known good key manager 14, encrypted with the current end station private key 40. Key manager 14 must acknowledge the report before any further processing of the session is allowed.

Figure 8C:
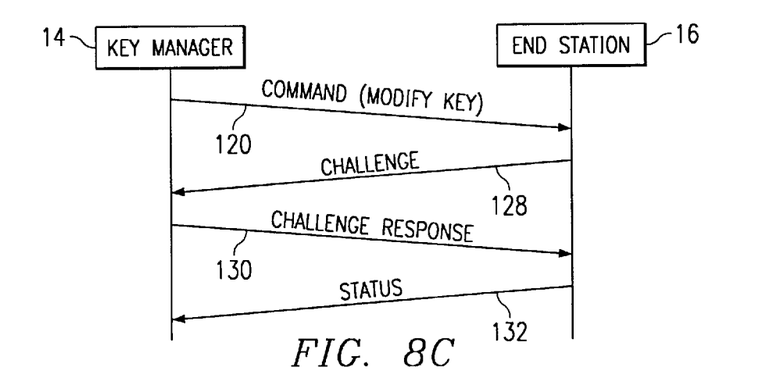

Referring now to FIG. 8C, the second and third commands associated with command message 120 allow key manager 14 to update or otherwise modify current master configuration public key 38 or current master sequence key 42, respectively as needed or desired. The command may be sent using the current master configuration private key as the encryption key. Upon receipt of this command, end station 16 returns a challenge message 128 reporting its receipt of the command and encrypted using end station private key 40. Key manager 14 responds to message 128 with a challenge response message 130 encrypted using the public key of the end station public/private key set and signed with the current master configuration private key. Following the authentication of both the initial message 120 and the challenge response message 130, end station 16 replaces the indicated current master configuration public key 38 or the current master sequence key 42 with the value provided. End station 16 sends a status message 132 to key manager 14, encrypted using the new current master configuration public key 38, reporting a successful completion of the operation. In one embodiment, this sequence must be completed before any further processing of the session is allowed. To increase the security of system 8, it may be desirable to change the current master sequence key 42 on a periodic basis according to particular needs.

Figure 8D:
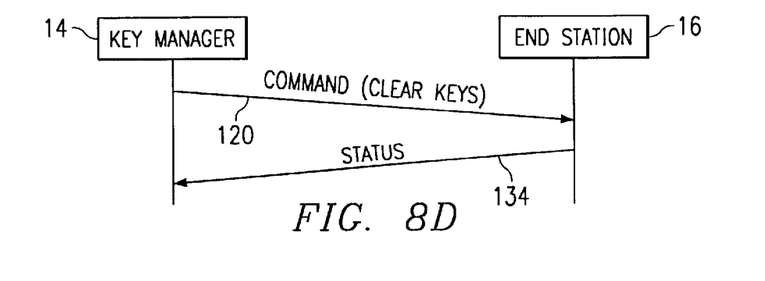

Referring now to FIG. 8D, the fourth command associated with command message 120 allows the key manager 14 to clear one or more keys 38, 40, and 42 to all zeros or to otherwise reset end station 16. In one embodiment, this is an infrequently used command associated with: (1) the initial installation of end station 16 at a customer site, or (2) the removal of end station 16 from service. Upon receipt of this command, end station 16 returns a status message 134 reporting its receipt of the command and indicating that is has completed the instructed operation. The challenge and response sequences described above are eliminated due to the potential need to initialize the end station 16 in unknown conditions. Status message 134 is not encrypted since end station private key 40 is no longer available.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. An end station coupled to a telecommunications network and operable to participate in a communications session with another end station using the network, the end station comprising:
   an encryptor comprising at least a first linear feedback shift register (LFSR) and at least an associated first interconnect mask having a length not greater than the length of the first LFSR, the encryptor operable to generate an output sequence using the first LFSR and the first interconnect mask;
   an interconnect mask table containing a plurality of polynomials, each polynomial corresponding to an available interconnect mask; and
   the end station operable to receive a session key specifying the first interconnect mask, the end station further operable to use the output sequence of the encryptor to encrypt an information stream during the session.

2. The end station of claim 1, wherein the network comprises at least a local area network (LAN) supporting Internet Protocol (IP) and the end station is operable to use real time protocol (RTP) to communicate an audio information stream.

3. The end station of claim 1, wherein:
   the encryptor is a shrinking generator and further comprises a second LFSR, an associated second interconnect mask having a length not greater than the length of the second LFSR, and a logic device;
   the first and second LFSRs are Galois LFSRs of relatively prime lengths and operable to generate first and second outputs, respectively; and
   the logic device is operable to receive the first and second outputs and generate a pseudo-random number output sequence according to the first and second outputs.

4. The end station of claim 1, wherein the strength of the encryption may be varied according to the length of the specified first interconnect mask.

5. The end station of claim 1, further comprising a pointer table containing a plurality of pointers, each specifying a polynomial in the interconnect mask table.

6. The end station of claim 5, wherein:
   the session key specifies a first pointer from the pointer table; and
   the first interconnect mask is specified according to the first pointer.

7. The end station of claim 5, wherein the number of pointers stored in the pointer table is fewer than the number of polynomials stored in the interconnect mask table.

8. The end station of claim 1, wherein the session key further specifies an initial state for the first LFSR.

9. The end station of claim 1, wherein the encryptor comprises a second LFSR and an associated second interconnect mask.

10. The end station of claim 9, wherein the session key further specifies a second pointer to specify the second interconnect mask.

11. The end station of claim 10, wherein:
    the session key comprises a first end and a second end;
    from the first end to the second end the session key comprises at least a first pointer portion and a first initial state portion specifying the first pointer and an initial state for the first LFSR, respectively; and
    from the second end to the first end the session key comprises at least a second pointer portion and a second initial state portion specifying the second pointer and an initial state for the second LFSR, respectively.

12. The end station of claim 11, wherein the effective length of the session key is equal to at least the sum of the lengths of the first pointer portion, the first initial state portion, the second pointer portion, and the second initial state portion.

13. The end station of claim 1, further comprising:
    an alternative interconnect mask table containing a plurality of polynomials that are longer than the polynomials stored in the interconnect mask table, each polynomial in the alternative interconnect mask table corresponding to an interconnect mask; and
    wherein the session key specifies the first interconnect mask and the end station is further operable to use the output sequence to generate a more strongly encrypted information stream according to the longer specified polynomial.

14. The end station of claim 13, further comprising an alternative pointer table containing a plurality of alternative pointers, each specifying a polynomial in the alternative interconnect mask table.

15. The end station of claim 14, wherein:
    the session key specifies a first alternative pointer; and
    the first interconnect mask is specified according to the first alternative pointer.

16. A system for communicating over a network, comprising:
    first and second end stations coupled to the network and operable to participate in a communications session with one another using the network;
    wherein each end station comprises:
      an encryptor that comprises at least a first linear feedback shift register (LFSR) and at least an associated first interconnect mask having a length not greater than the length of the first LFSR, the encryptor operable to generate an output sequence using the first LFSR and the first interconnect mask;
      an interconnect mask table containing a plurality of polynomials, each polynomial corresponding to an available interconnect mask;
      a pointer table containing a plurality of pointers, each pointer specifying a polynomial in the interconnect mask table; and
    wherein the end station is operable to receive a session key specifying a first pointer from the pointer table, the first interconnect mask is specified according to the first pointer, and the end station being further operable to use the output sequence of the encryptor to encrypt an information stream during the session.

17. The system of claim 16, wherein the network comprises at least a local area network (LAN) supporting Internet Protocol (IP) and the end stations are operable to use real time protocol (RTP) to communicate audio information streams.

18. The system of claim 16, wherein:
    the encryptor is a shrinking generator and further comprises a second LFSR, an associated second interconnect mask having a length not greater than the length of the second LFSR, and a logic device;
    the first and second LFSRs are Galois LFSRs of relatively prime lengths and operable to generate first and second outputs, respectively; and
    the logic device is operable to receive the first and second outputs and to generate a pseudo-random number output sequence according to the first and second outputs.

19. The system of claim 16, wherein the strength of the encryption may be varied according to the length of the specified first interconnect mask.

20. The system of claim 16, wherein the number of pointers stored in the pointer table is fewer than the number of polynomials stored in the interconnect mask table.

21. The system of claim 16, wherein the interconnect mask specified for the first end station is different than the interconnect mask specified for the second end station.

22. The system of claim 16, wherein the session key further specifies an initial state for the first LFSR.

23. The system of claim 16, wherein the encryptor comprises a second LFSR and an associated second interconnect mask, the session key further specifying a second pointer to specify the second interconnect mask.

24. The system of claim 23, wherein:
the session key comprises a first end and a second end:
from the first end to the second end the session key comprising at least a first pointer portion and a first initial state portion specifying the first pointer and an initial state for the first LFSR, respectively; and
from the second end to the first end the session key comprising at least a second pointer portion and a second initial state portion specifying the second pointer and an initial state for the second LFSR, respectively.

25. The system of claim 24, wherein the effective length of the session key is equal to at least the sum of the lengths of the first pointer portion, the first initial state portion, the second pointer portion, and the second initial state portion.

26. The system of claim 16, further comprising a third end station coupled to the network and operable to participate in a communications session with the first end station using the network, wherein the first end station further comprises:
an alternative interconnect mask table containing a plurality of polynomials that are longer than the polynomials stored in the interconnect mask table, each polynomial in the alternative interconnect mask table corresponding to an interconnect mask;
an alternative pointer table containing a plurality of alternative pointers, each specifying a polynomial in the alternative interconnect mask table; and
wherein the session key specifies a first alternative pointer, the first interconnect mask being specified according to the first alternative pointer, the first end station further operable to use the output sequence to generate an information stream during the session with the third end station, the information stream for the third end station being more strongly encrypted than the information stream for the second end station according to the longer specified polynomial.

27. A method for communicating information during a communications session, comprising:
storing a plurality of polynomials in an interconnect mask table, each polynomial corresponding to an available interconnect mask;
receiving a session key specifying the first interconnect mask;
generating an output sequence using at least a first linear feedback shift register (LFSR) and the specified first interconnect mask, the first interconnect mask having a length not greater than the length of the first LFSR; and
using the output sequence to encrypt an information stream during the session.

28. The method of claim 27, wherein the information stream comprises an audio information stream communicated over at least a local area network (LAN) using at least Internet Protocol (IP) and real time protocol (RTP).

29. The method of claim 27, further comprising:
generating a first output at the first LFSR, the first LFSR being a Galois LFSR of a first length;
generating a second output at a second LFSR, the second LFSR being a Galois LFSR of a second length that is prime relative to the first length, the second LFSR having an associated second interconnect mask of a length not greater than the length of the second LFSR;
receiving the first and second outputs at a logic device; and
generating a pseudo-random number output sequence according to the first and second outputs.

30. The method of claim 27, further comprising specifying a first interconnect mask of a different length to vary the strength of the encryption.

31. The method of claim 27, further comprising storing in a pointer table a plurality of pointers, each specifying a polynomial in the interconnect mask table.

32. The method of claim 31, wherein the session key specifies a first pointer from the pointer table, the first interconnect mask being specified according to the first pointer.

33. The method of claim 31, wherein the number of pointers stored in the pointer table is fewer than the number of polynomials stored in the interconnect mask table.

34. The method of claim 27, wherein the session key further specifies an initial state for the first LFSR.

35. The method of claim 27, wherein the session key further specifies a second interconnect mask for a second LFSR, the first and second LFSRs being within a shrinking generator.

36. The method of claim 35, wherein the session key specifies a second pointer to specify the second interconnect mask.

37. The method of claim 36, wherein:
the session key comprises a first end and a second end;
from the first end to the second end the session key comprising at least a first pointer portion and a first initial state portion specifying the first pointer and an initial state for the first LFSR, respectively; and
from the second end to the first end the session key comprising at least a second pointer portion and a second initial state portion specifying the second pointer and an initial state for the second LFSR, respectively.

38. The method of claim 37, wherein the effective length of the session key is equal to at least the sum of the lengths of the first pointer portion, the first initial state portion, the second pointer portion, and the second initial state portion.

39. The method of claim 27, further comprising:
storing a plurality of polynomials in an alternative interconnect mask table that each correspond to an interconnect mask and are each longer than the polynomials stored in the interconnect mask table;
specifying one of the polynomials in the alternative interconnect mask table using the session key to specify the first interconnect mask; and
using the output sequence to generate a more strongly encrypted information stream according to the longer specified polynomial.

40. The method of claim 39, further comprising storing in an alternative pointer table a plurality of alternative pointers that each specify a polynomial in the alternative interconnect mask table.

41. The method of claim 40, further comprising specifying a first alternative pointer using the session key, the first interconnect mask being specified according to the first alternative pointer.

* * * * *